Patented Aug. 11, 1942

2,292,443

UNITED STATES PATENT OFFICE 2,292,443

PROCESS FOR PREPARING POLYMERIC POLYAMIDES

William E. Hanford, Wilmington, Del., assignor to E. I. du Pont de Nemours & Company, Wilmington, Del., a corporation of Delaware No Drawing. Application July 17, 1940, Serial No. 346,036

10 Claims. (Cl. 260—2)

This invention relates to polymeric materials, and more particularly to a new process for making linear carbamide polymers.

Common subject matter appears in applicant's application Serial No. 232,469, filed September 29, 1938.

Polymethylene carbamide has been prepared by heating a mixture of tetramethylene diamine and carbon dioxide in a closed vessel. Carbamide polymers of high molecular weight having fiber-forming properties are included with other linear polyamides of these properties obtained from diamines and dibasic carboxylic acids disclosed in Patents 2,071,250 and 2,130,948. The present invention is particularly concerned with the manufacture of the fiber-forming carbamide polymers from reactants not heretofore used in the manufacture of polyamides.

An object of this invention is to provide a new and improved process for the preparation of linear carbamide polymers. A further object is to prepare linear carbamide polymers which can be utilized in the manufacture of synthetic fibers. Other objects will appear hereinafter.

These objects are accomplished by reacting, in substantially equimolecular proportions, a diisocyanate of the general formula OCN—R—NCO with a diamine of the general formula R''NH—R'—NHR''' wherein R and R' are divalent organic radicals in which the terminal atoms are carbon and R'' and R''' are hydrogen or monovalent hydrocarbon radicals, until a polymer of the desired properties is prepared.

Substantially equimolecular quantities of a diamine and a diisocyanate are reacted at polymerizing temperatures, generally between 50 and 250° C., until a polymer of the desired properties (degree of polymerization) is attained. By "substantially equimolecular quantities" is meant not more than 5% molar excess of either reactant. In its preferred embodiment the reaction is continued until the product exhibits fiber-forming properties. Generally the polymeric carbamides do not exhibit fiber-forming properties until their intrinsic viscosity (as defined in the above mentioned Patent 2,130,948) is at least 0.2.

It is preferable to operate in a medium which dissolves the polymer as well as the reactants. Although the presence of such a solvent is by no means necessary, its use permits formation of a homogeneous reaction mixture at a temperature substantially lower than that necessary if the reactants were melted together.

The reaction involved may be represented as follows:

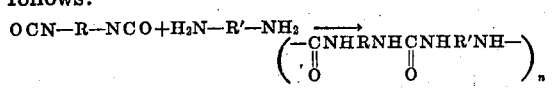

wherein R and R' are divalent organic radicals which may be identical or different. Neither R nor R' should have attached any functional groups, other than those indicated in the above equation, which would react under the conditions of polymerization with the isocyanate groups or the amine groups. Preferably R and R' are hydrocarbons. It is to be observed that polymeric carbamides cannot be obtained by reaction between a monoamine and an isocyanate.

The invention is illustrated by the following examples in which the quantities of reagents are given in parts by weight:

Example I

Decamethylene diisocyanate is prepared by dissolving 86 parts of decamethylenediamine in 1155 parts of warm xylene to which is added 36.5 parts of dry hydrogen chloride. The suspension of decamethylenediamine dihydrochloride is heated to boiling, a small additional amount of hydrogen chloride is added, and the suspension is heated at reflux while a slow stream of dry phosgene is passed into the liquid. When most of the solid is dissolved the solution is filtered, the xylene removed from under reduced pressure and the remainder distilled twice, giving 75 parts of decamethylene diisocyanate boiling at 151–153° C. at 3 mm. pressure.

To a solution of 19 parts of decamethylenediamine in 39 parts of m-cresol is added 24.7 parts of decamethylene diisocyanate. A precipitate forms at once with considerable evolution of heat. The mixture is then heated at 218° C. whereupon the precipitate dissolves and the clear solution soon becomes viscous. After 5 hours at 218° C. the solution is poured into a large volume of ethanol. The polymer, polydecamethylene carbamide, separates as a white solid which is then thoroughly washed with ethanol. Its melting point is 209–210° C. It is readily spinnable to long filaments capable of being cold drawn into oriented fibers. The intrinsic viscosity of a solution of this polymer in m-cresol is 0.28. In this and the following examples it is possible to use a hydroxylated solvent since diisocyanates react with amino groups considerably faster than with hydroxyl groups.

Example II

To a solution of 17 parts of decamethylene diamine in 45 parts of ethanol is added 22 parts of decamethylene diisocyanate. Heat is evolved and a white solid separates. The polymeric carbamide so obtained melts to a clear, viscous melt and is capable of being drawn into filaments.

Example III

To a solution of 7.9 parts of hexamethylenediamine in 15 cc. of m-cresol is added 11.4 parts of hexamethylene diisocyanate (B. P. 111–112° C./4 mm.). A precipitate forms immediately with evolution of much heat. On heating the mixture the precipitate all dissolves and a clear solution is obtained. This solution is heated at 205–210° C. for seven hours, then diluted with alcohol, whereupon the polymeric carbamide precipitates as a light gray solid. After thorough washing with alcohol, the polymer melts at 269–270° C. It can be spun into filaments which can be cold drawn.

*Example IV*

A mixture of 39.7 parts of m-phenylene diisocyanate (M. P. 50–51° C.) and 26.8 parts of m-phenylene diamine is heated in an atmosphere of oxygen-free nitrogen at 140° C. for 30 minutes, then at 180° C. for 4 hours. The mixture is incompletely fused at this temperature; even at 340° C. a portion of the product remains solid. The polymer is a glassy solid, capable of being drawn into filaments.

*Example V*

A solution of 8.4 parts of hexamethylene diisocyanate in 15 parts of dimethylformamide is added to a solution of 7.8 parts of p-xylylenediamine in 10 parts of dimethylformamide. An additional 200 parts of the solvent is added and the white solid which forms is broken up and heated in a solvent for one-half hour. At the end of this time the white solid is collected on a filter and is dried. It is insoluble in ethyl alcohol and melts with decomposition above 305° C.

*Example VI*

A solution of 8.4 parts of hexamethylene diisocyanate in 50 parts of dimethylformamide is added to a solution of 8.2 parts of N,N'-dimethylxylylene diamine in 50 parts of the same solvent. The clear solution which results is heated at gentle refluxing temperature for one hour. The solution is poured into 500 parts of ethyl alcohol. On cooling a white precipitate forms and this is collected on a filter and is dried.

The final product was a brittle solid having a softening point of 80° C. and capable of being spun into fibers.

Examples of other diisocyanates that may replace those given in the examples are as follows: Polymethylene diisocyanates, such as ethylene diisocyanate, trimethylene diisocyanate, and hexadecamethylene diisocyanate; alkylene diisocyanates such as propylene-1,2-diisocyanate, butylene-1,2-diisocyanate, butylene-1,3-diisocyanate, and butylene-2,3-diisocyanate; alkylidene diisocyanates such as ethylidene diisocyanate, propylidene-1,1-diisocyanate, and propylidene-2,2-diisocyanate; cycloalkylene diisocyanates such as cyclopentylene-1,3-diisocyanate, cyclohexylene-1,2-diisocyanate, and cyclohexylene-1,4-diisocyanate; aromatic diisocyanates such as o-phenylene diisocyanate, p-phenylene diisocyanate, naphthylene-1,4-diisocyanate and diphenylene-4,4'-diisocyanate; aralkyl diisocyanates such as xylylene-1,4-diisocyanate, xylylene-1,3-diisocyanate, 4,4'-diphenyl methane diisocyanate or 4,4'-diphenyl propane diisocyanate, etc. Any diisocyanate of the general formula OCN–R–NCO in which R is a divalent organic radical not carrying a functional group or groups, other than the two isocyanate groups, which will react with an isocyanate group or an amino group under the conditions of polymer formation, will react with a wide variety of diamines to give polymeric carbamides. For example a diisocyanate such as $(OCNCH_2CH_2CH_2O)_2$ or its sulfur analog is operable. The preferred diisocyanates, however, are those in which the isocyanate groups are separated by a hydrocarbon radical containing a chain of at least 4 carbon atoms between the isocyanate groups. A large number of diamines may be used in place of those mentioned in the examples, as for instance polymethylene, alkylene, cycloalkylene, aromatic and aliphatic-aromatic diamines, primary or secondary. As particular examples of other diamines, there may be mentioned ethylenediamine, trimethylenediamine, tetramethylenediamine, octamethylenediamine, dodecamethylenediamine, N,N'-dimethylhexamethylenediamine, N,N'-dimethyldecamethylenediamine, N,N'-dibenzylhexamethylenediamine, cyclohexylene-1,4-diamine, o-phenylenediamine, p-phenylenediamine, benzidine, naphthylene-1,4-diamine, γ,γ'-diaminodibutyl oxide, γ,γ'-diaminodibutyl sulfide, etc. The preferred diamines are diprimary diamines in which the amino groups are separated by a hydrocarbon radical containing a chain of at least 4 carbon atoms between the amino groups.

The polymerization may be conducted either in the presence or absence of solvents or diluents and at atmospheric, superatmospheric or subatmospheric pressures. The reaction is preferably conducted in the absence of oxygen or moisture, which may be accomplished either by operating in a partial vacuum or in the presence of an inert gas such as nitrogen. In some cases the reaction proceeds at ordinary temperatures but in most cases it is desirable to operate at temperatures not substantially below 100° C. This reaction does not require a high temperature and in general it is advantageous to operate below 250° C. Modifying agents, such as plasticizers or delusterants, may be incorporated with the reaction mixture provided they do not react with the functional groups.

The polymer may be freed of solvent by direct distillation of the solvent under reduced pressure, or the polymer may be precipitated by the addition of a solvent in which it is insoluble, such as methanol, ethanol, acetone, or ethyl acetate. It may be advantageous in some cases to operate in a medium in which the polymer is insoluble and from which it separates as soon as it forms.

In the preferred embodiment of this invention the reactants are heated until the resulting polymer exhibits fiber-forming properties. This stage is readily determined by touching the molten polymer with a glass rod and drawing the rod quickly away. If the fiber-forming stage is reached a filament of considerable strength and pliability will be formed which is capable of being cold drawn, that is drawn by application of tensile stress below its melting point, into fibers which exhibit upon X-ray examination molecular orientation along the fiber-axis. This process, however, is not limited to the manufacture of the fiber-forming polymers and it is within the scope of this invention to discontinue heating before that stage is reached. The low molecular weight or non-fiber-forming polymers are useful for certain applications, e. g., molding or coating compositions. Viscosity-stabilized polymers, i. e., polymers capable of remaining substantially unchanged in viscosity (molecular weight) under continued conditions of heating as in spinning, film-pressing, or compounding, can be prepared by using as viscosity stabilizing agent one reactant (either diamine or diisocyanate) in excess of the chemically equivalent amount. Viscosity stabilized polymers may also be prepared by adding as viscosity stabilizing agent a small amount of a different diamine or monoamine, a different diisocyanate or monoisocyanate, or a monobasic or dibasic acid. If fiber-forming products are desired, not more than 5 molar per cent of the viscosity stabilizing agent should be used.

It is possible by this process to prepare polymeric carbamides containing mixed organic radicals by reacting a diisocyanate of the formula OCN—R—NCO with a diamine of the formula NH$_2$R'—NH$_2$ wherein R and R' are different organic radicals. Furthermore, it is possible to prepare interpolymers by reacting two or more different diamines with a single diisocyanate, or conversely two or more different diisocyanates with a single diamine.

The polymeric carbamides are colorless or light-colored solids of high melting points. They are insoluble in the common solvents but may be dissolved in certain solvents such as m-cresol, nitrobenzene or formic acid. This property permits spinning from solutions whenever the melting point of the polymeric carbamide is too high to allow spinning from the melt. The filaments may be cold drawn to highly oriented fibers.

The polymeric carbamides obtained by the present process are generally useful for the purposes mentioned in connection with the polyamides described in the above mentioned patents. The more important of these uses are the production of continuous oriented filaments suitable to be used as artificial silk, artificial hair, bristles, threads, ribbons, etc. The polymeric carbamides are also of value as coating agents for cloth, paper, leather, etc. Furthermore, they are well adapted for use in the manufacture of safety glass interlayers since they are capable of being molded into clear, tough sheets adhering tenaciously to glass.

In these and other uses the polymeric carbamides may be admixed with other polymers, resins, plasticizers, pigments, dyes, etc.

The new process described herein permits the preparation of linear polymers with a wide range of molecular weight. The present invention is further advantageous in that it does not require such high temperatures as most superpolymeric reactions and since there is no evolution of by-products can be carried out without difficulty in closed vessels.

As many apparently widely different embodiments of this invention may be made without departing from the spirit and scope thereof, it is to be understood that I do not limit myself to the specific embodiments thereof except as defined in the appended claims.

I claim:

1. A process for making polymeric carbamides which comprises heating to reaction temperature substantially equimolecular quantities of a diisocyanate of the general formula OCN—R—NCO with a diamine of the general formula

R''NH—R'—NHR''' wherein R and R' are divalent organic radicals in which the terminal atoms are carbon, and R'' and R''' are constituents of the class consisting of hydrogen and monovalent hydrocarbon radicals.

2. A process which comprises heating to reaction temperature substantially equimolecular quantities of a diisocyanate of the general formula OCN—R—NCO and a diamine of the general formula R''NH—R'—NH—R''' wherein R and R' are divalent organic radicals in which the terminal atoms are carbon, and R'' and R''' are constituents of the class consisting of hydrogen and monovalent hydrocarbon radicals, and continuing the reaction until a fiber-forming polymeric carbamide is obtained.

3. A process for making polymeric carbamides which comprises heating to reaction temperature a solution in organic solvent of substantially equimolecular quantities of a diisocyanate of the general formula OCN—R—NCO with a diamine of the general formula R''NH—R'—NHR''' wherein R and R' are divalent organic radicals in which the terminal atoms are carbon, and R'' and R''' are constituents of the class consisting of hydrogen and monovalent hydrocarbon radicals.

4. A process which comprises heating to reaction temperature in the presence of a viscosity stabilizing agent substantially equimolecular quantities of a diisocyanate of the general formula OCN—R—NCO and a diamine of the general formula R''NH—R'—NH—R''' wherein R and R' are divalent organic radicals in which the terminal atoms are carbon, and R'' and R''' are constituents of the class consisting of hydrogen and monovalent hydrocarbon radicals, and continuing the reaction until a fiber-forming polymeric carbamide is obtained, said agent being selected from the class consisting of monoamines, diamines, monoisocyanates, diisocyanates, monobasic acids, and dibasic acids.

5. The process set forth in claim 2 in which said temperature is between 50° C and 200° C.

6. The process set forth in claim 1 in which said diisocyanate is hexamethylene diisocyanate.

7. The process set forth in claim 1 in which said diisocyanate is decamethylene diisocyanate.

8. The process set forth in claim 1 in which said diamine is decamethylene diamine.

9. The process set forth in claim 1 in which said diamine is hexamethylene diamine.

10. A process for making polymeric carbamides which comprises heating to reaction temperature decamethylene diisocyanate with decamethylene diamine.

WILLIAM E. HANFORD.